United States Patent
Yokoyama

(10) Patent No.: US 9,235,025 B2
(45) Date of Patent: Jan. 12, 2016

(54) IMAGING OPTICAL SYSTEM AND IMAGE PICKUP APPARATUS INCLUDING THE SAME

(71) Applicant: CANON KABUSHIKI KAISHA, Tokyo (JP)

(72) Inventor: Takayoshi Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 14/133,236

(22) Filed: Dec. 18, 2013

(65) Prior Publication Data

US 2014/0176782 A1  Jun. 26, 2014

(30) Foreign Application Priority Data

Dec. 21, 2012 (JP) ................... 2012-279048

(51) Int. Cl.
*G02B 9/14* (2006.01)
*H04N 5/225* (2006.01)
*G02B 9/28* (2006.01)
*G02B 9/24* (2006.01)

(52) U.S. Cl.
CPC .. *G02B 9/14* (2013.01); *G02B 9/24* (2013.01); *G02B 9/28* (2013.01); *H04N 5/2254* (2013.01)

(58) Field of Classification Search
CPC .............. G02B 9/14; G02B 9/24; G02B 9/28; H04N 5/2254
See application file for complete search history.

(56) References Cited

U.S. PATENT DOCUMENTS

| | | | |
|---|---|---|---|
| 4,852,984 A | 8/1989 | Takahashi et al. | |
| 5,009,491 A | 4/1991 | Hata | |
| 6,580,568 B2 * | 6/2003 | Ozaki | G02B 13/02 359/745 |
| 9,116,286 B2 * | 8/2015 | Hayashi | G02B 7/08 |
| 2011/0075268 A1 | 3/2011 | Ishibashi | |
| 2015/0085387 A1 * | 3/2015 | Miwa | G02B 15/173 359/785 |
| 2015/0205080 A1 * | 7/2015 | Yokoyama | G02B 15/15 348/240.3 |

FOREIGN PATENT DOCUMENTS

| | | |
|---|---|---|
| CN | 101833162 A | 9/2010 |
| CN | 102084279 A | 6/2011 |
| CN | 102346293 A | 2/2012 |
| EP | 0473099 A1 | 3/1992 |
| JP | H01-185507 A | 7/1989 |
| JP | H05-264903 A | 10/1993 |
| JP | H09-325269 A | 12/1997 |

* cited by examiner

*Primary Examiner* — David N Spector
(74) *Attorney, Agent, or Firm* — Canon USA, Inc. I.P. Division

(57) ABSTRACT

An imaging optical system includes, in order from an object side to an image side, a first lens unit having a positive refractive power, a second lens unit having a negative refractive power, an aperture stop, and a third lens unit having a positive refractive power. The second lens unit moves toward the image side during focusing from a far object to a near object. The third lens unit includes, in order from the object side to the image side, two lenses having concave surfaces that face each other with a largest air gap in the third lens unit provided therebetween, and a positive lens. A focal length of the entire imaging optical system and a focal length of the second lens unit are appropriately set.

11 Claims, 13 Drawing Sheets

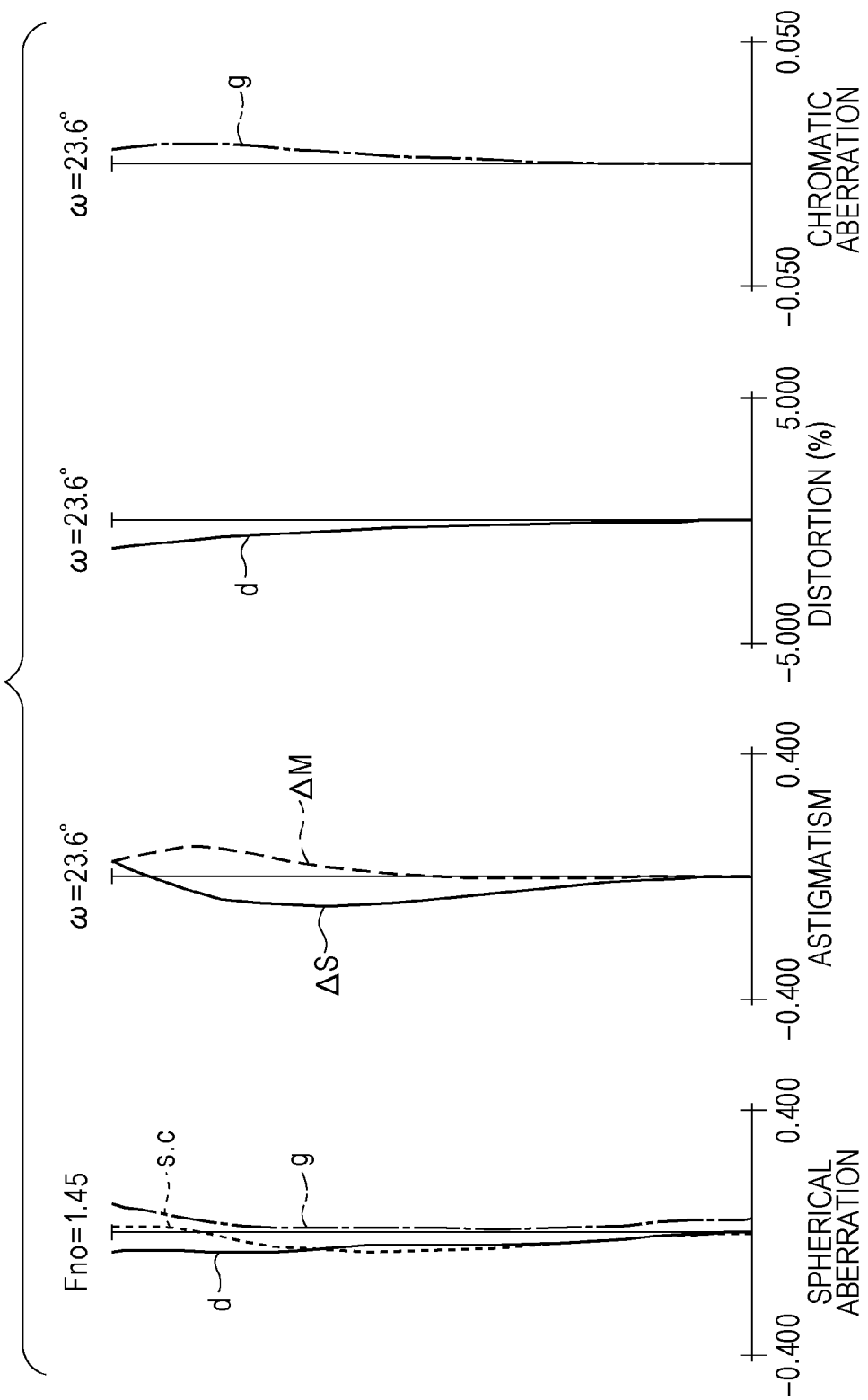

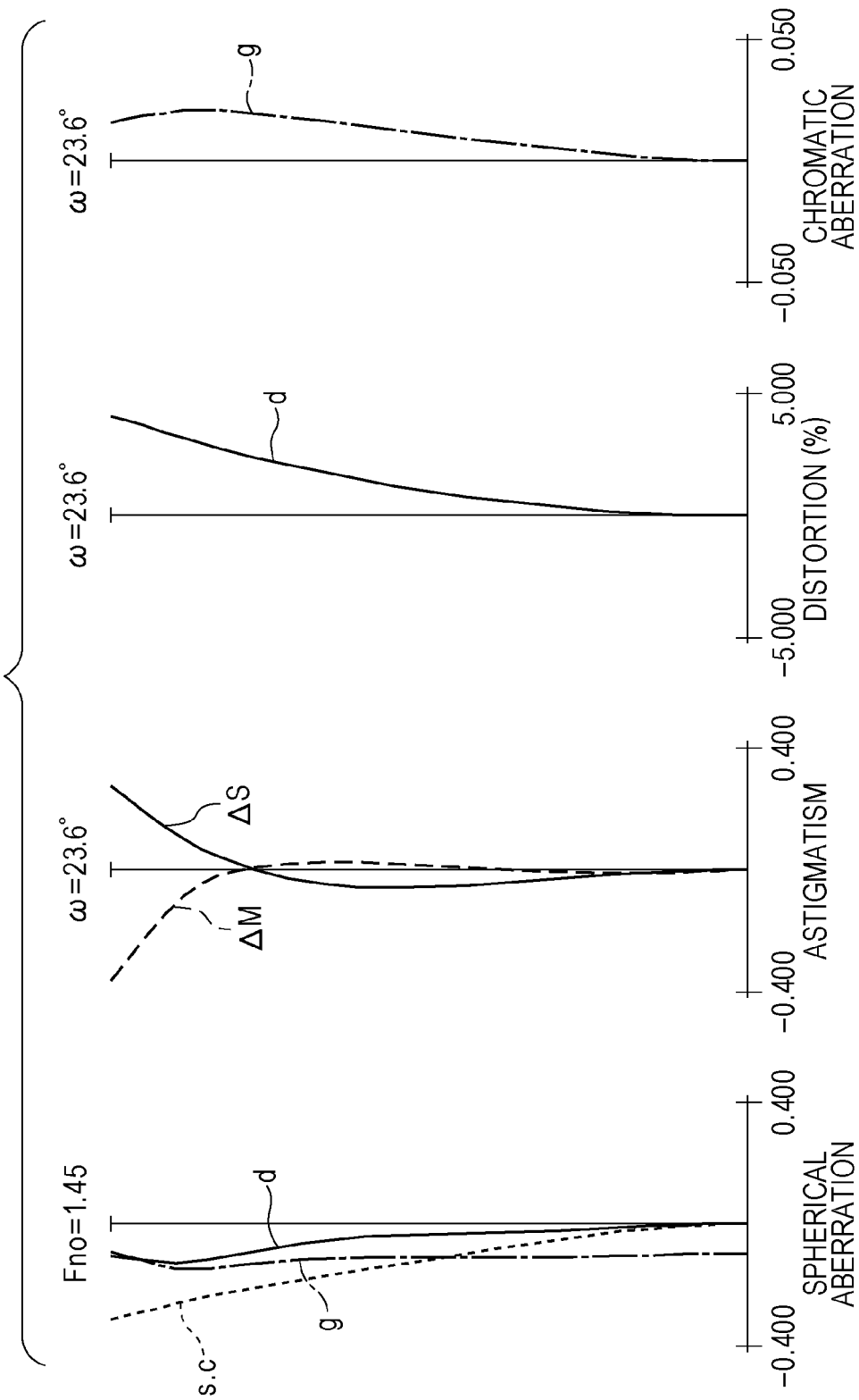

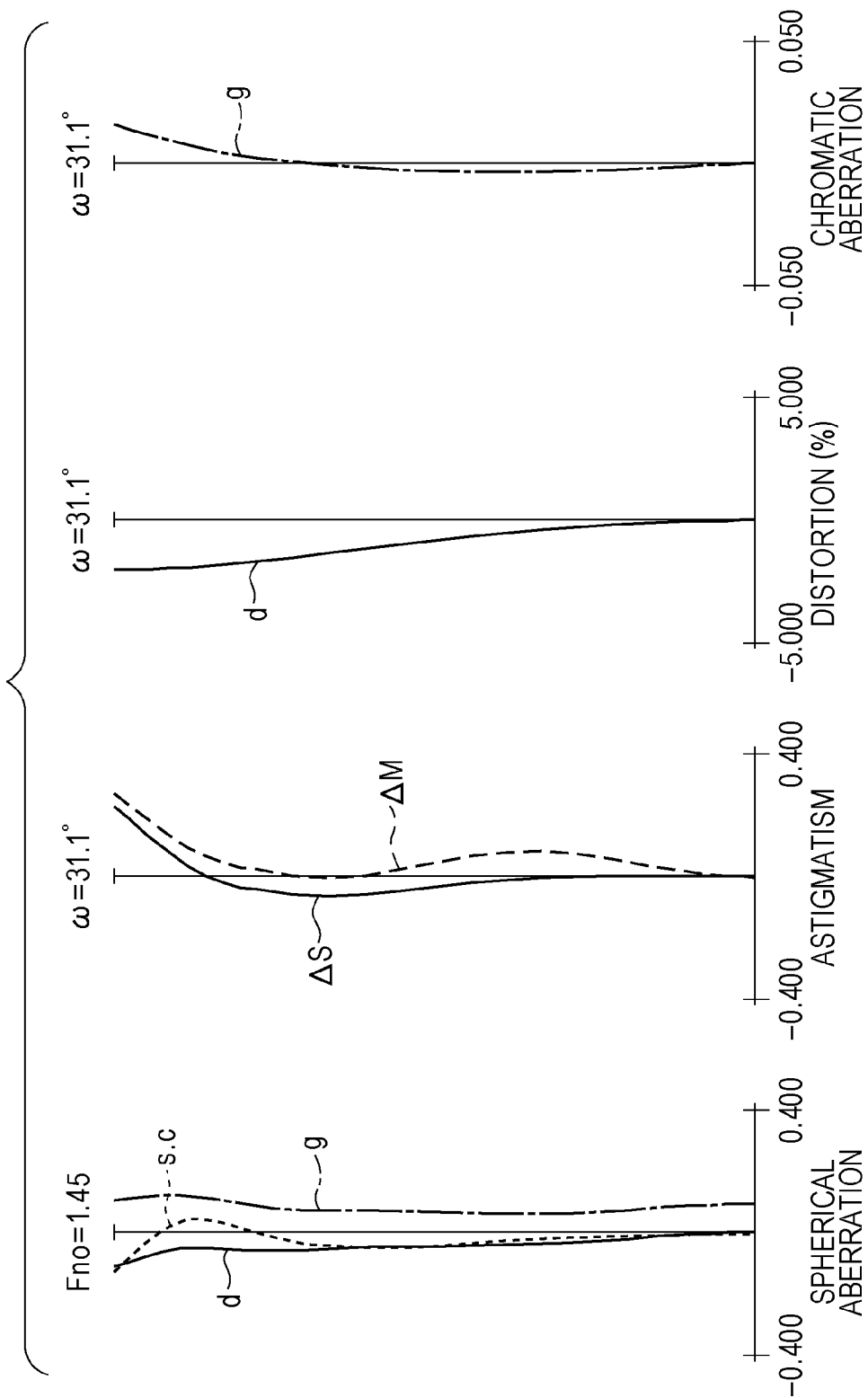

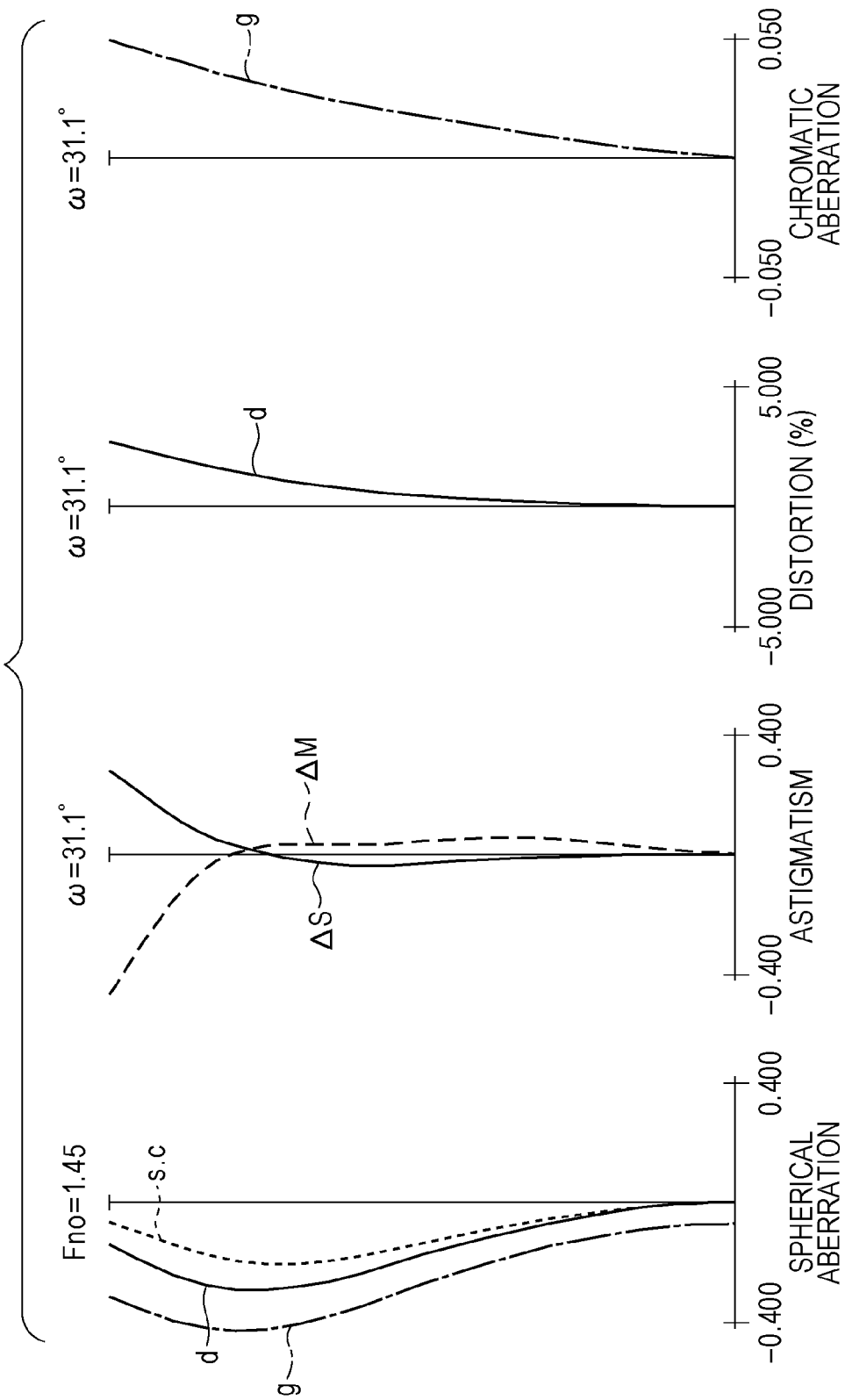

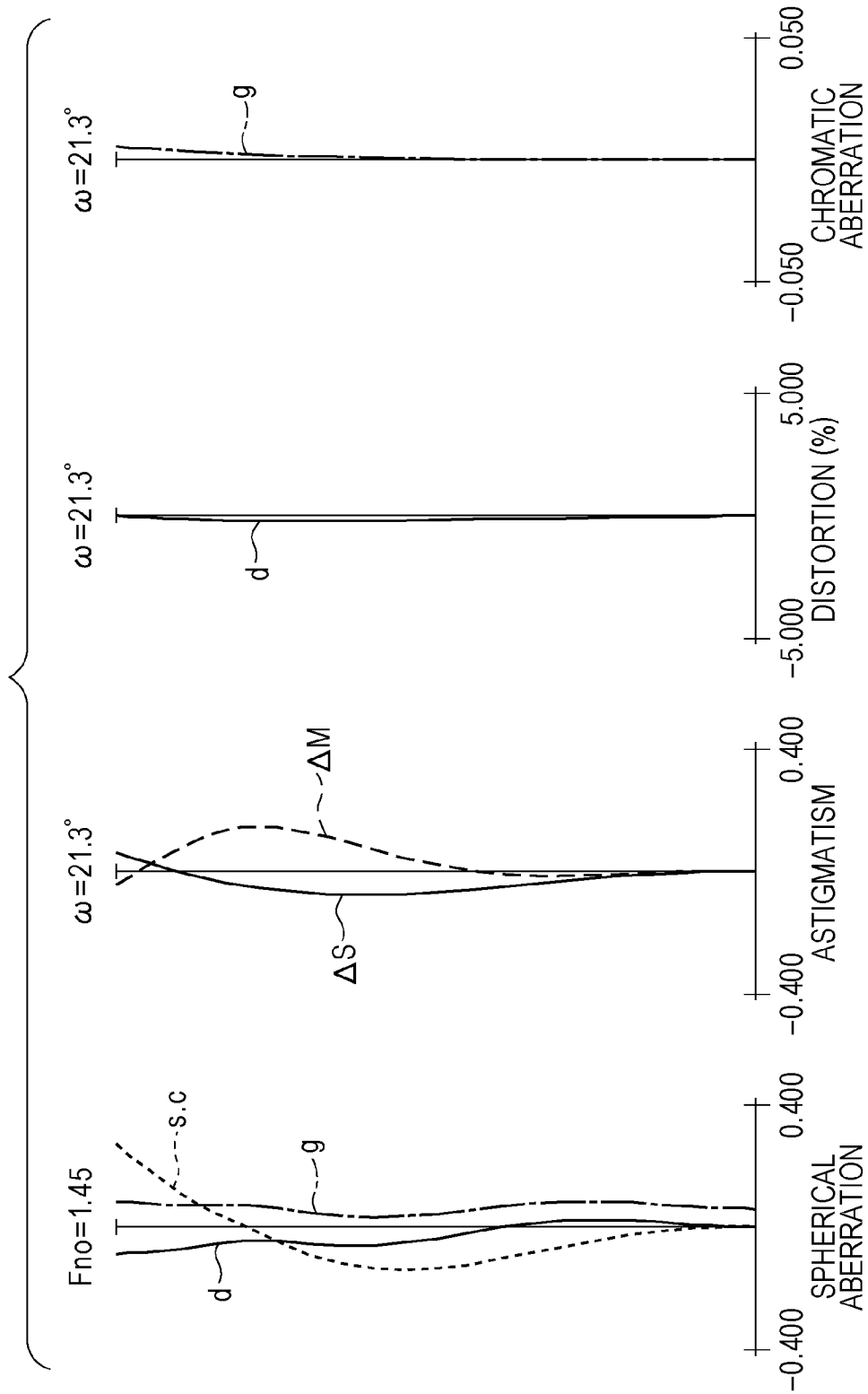

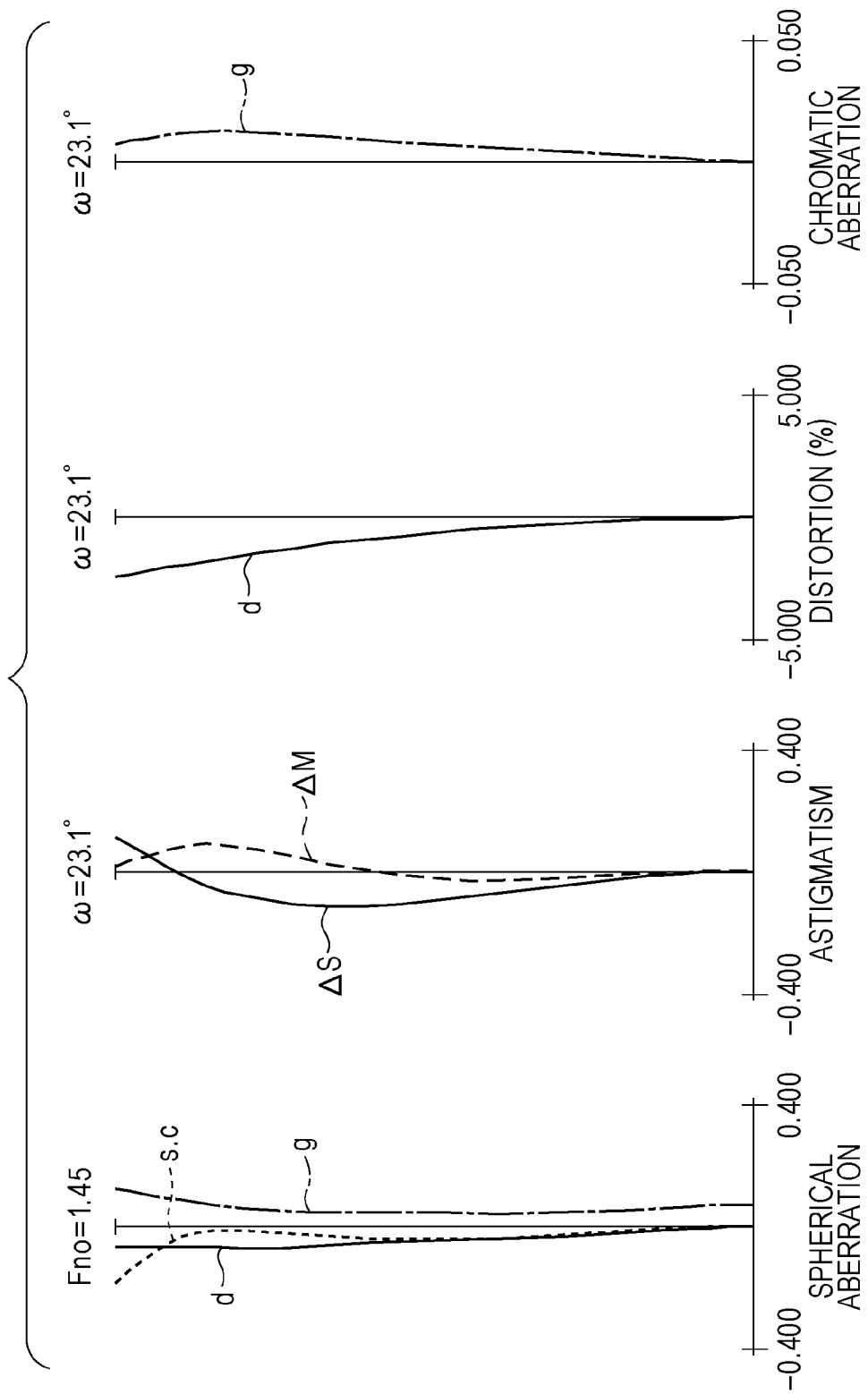

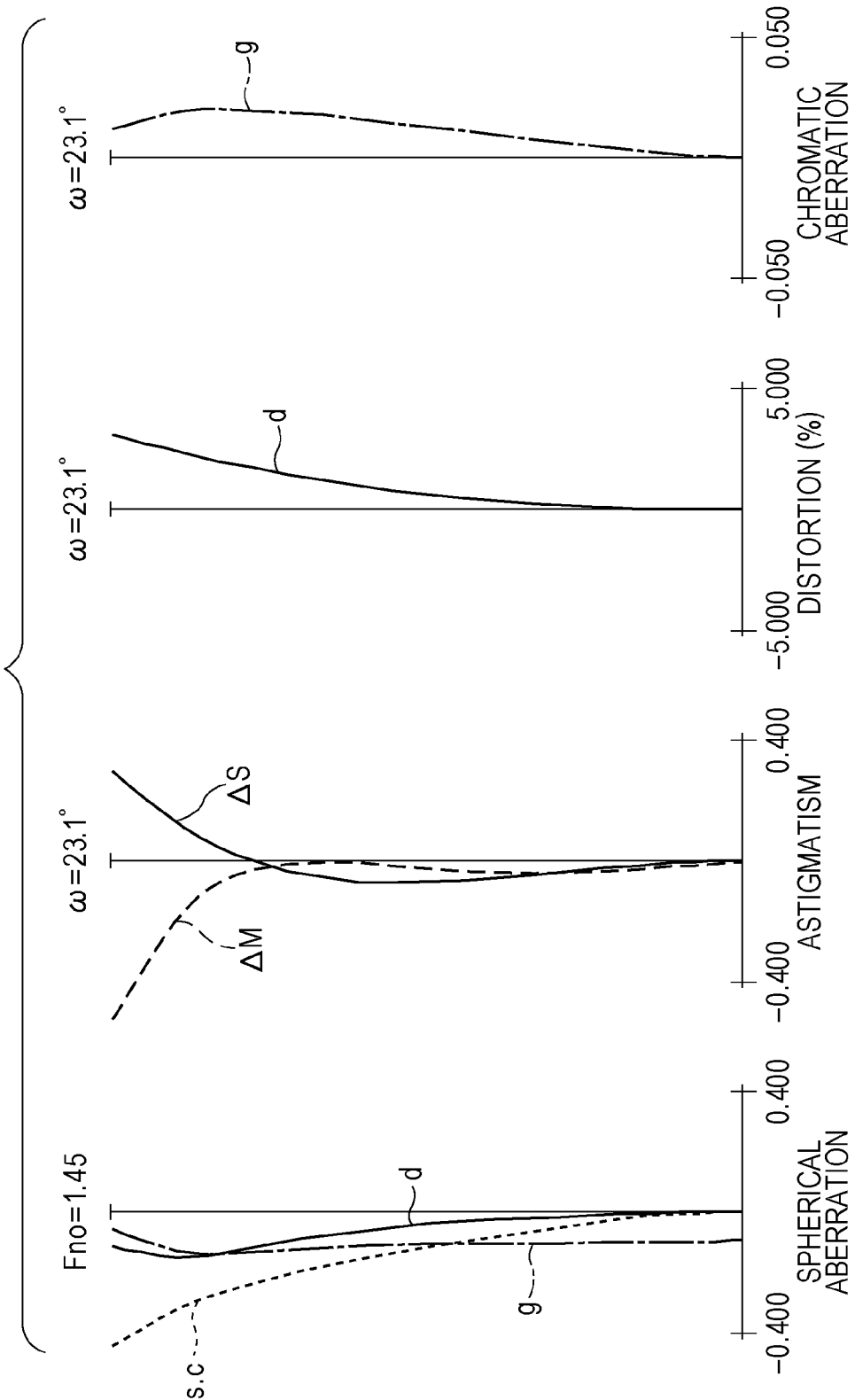

IMAGING OPTICAL SYSTEM AND IMAGE PICKUP APPARATUS INCLUDING THE SAME

BACKGROUND OF THE INVENTION

1. Field of the Invention

The present disclosure relates to imaging optical systems and image pickup apparatuses including the imaging optical systems, and is suitable for an imaging optical system included in, for example, a digital still camera, a digital video camera, a TV camera, a monitoring cameras, or a silver-halide film camera.

2. Description of the Related Art

Imaging optical systems included in single-lens reflex digital still cameras and single-lens reflex silver-halide film cameras are required to have a large imaging angle of view of about 40° to 60°. Such an imaging optical system is also required to have a predetermined back focus so that an optical member, such as a filter, may be arranged on the image side of the imaging optical system. Furthermore, the imaging optical system is also required to achieve high optical performance, have a large aperture ratio, and be capable of performing quick focusing. When the aperture ratio is increased, the shutter speed can be increased so that camera shake during, for example, indoor shooting can be easily suppressed.

In an imaging optical system, focusing is generally performed by moving the entire imaging optical system or a part of the imaging optical system. For example, an inner focus system is known which performs focusing by moving an intermediate lens unit included in the imaging optical system. With the inner focus system, the amount of movement of a focusing lens unit is smaller than that in the case where the entire imaging optical system is moved, and the size and weight of the focusing lens unit can be easily reduced.

As a result, the focusing lens unit can be moved at a high speed during focusing, and the drive torque applied during focusing can be reduced. Therefore, in the case where, for example, the system is included in an imaging apparatus including an automatic focus detection device, the size of a drive motor can be easily reduced.

Inner focus imaging optical systems having a relatively large imaging angle of view and a long back focus have been known. U.S. Pat. No. 4,852,984 and Japanese Patent Laid-Open No. 1-185507 disclose imaging optical systems which include, in order from an object side to an image side, a first lens unit having a positive refractive power, a second lens unit having a negative refractive power, and a third lens unit having a positive refractive power, and in which focusing is performed by moving the second lens unit.

In inner focus systems, focusing can be performed by moving a relatively small and light lens unit, so that high-speed focusing can be facilitated. In addition, a minimum imaging distance, at which imaging can be performed, is small.

However, compared to the case in which the entire optical system is moved during focusing, in the inner focus system, large variations in aberrations generally occur when the focusing lens unit is moved, and it is difficult to appropriately correct the aberrations over the entire object distance range. For example, in an inner focus system in which focusing is performed by moving an intermediate lens unit arranged near an aperture stop of the imaging optical system, large variations in spherical aberration and coma aberration occur during focusing. The tendency of variations in aberrations becomes more significant when the aperture ratio of the imaging optical system is increased.

When the aperture ratio of an inner focus imaging optical system having a large imaging angle of view of about 40° to 60° is increased, the thickness of each lens is increased. As a result, the back focus tends to be reduced to ensure enough space for the movement of the focusing lens unit.

Therefore, to increase the angle of view and the aperture ratio of an inner focus imaging optical system, it is necessary to appropriately set the refractive powers and lens configurations of lens units of the imaging optical system including the focusing lens unit. Unless the lens units are appropriately configured, large variations in aberrations occur during focusing and it becomes difficult to achieve high optical performance over the entire object distance. In particular, it becomes difficult to increase the back focus while increasing the angle of view and the aperture ratio.

SUMMARY OF THE INVENTION

An embodiment of the present invention provides an imaging optical system which has a large angle of view and a large aperture ratio and with which high-speed focusing can be easily performed and a back focus can be easily increased.

An imaging optical system according to an aspect of the present invention includes, in order from an object side to an image side, a first lens unit having a positive refractive power; a second lens unit having a negative refractive power; an aperture stop; and a third lens unit having a positive refractive power. The second lens unit moves toward the image side during focusing from a far object to a near object. The third lens unit includes, in order from the object side to the image side, two lenses having concave surfaces that face each other with a largest air gap in the third lens unit provided therebetween, and a positive lens. When f is a focal length of the entire imaging optical system and f2 is a focal length of the second lens unit, the following conditional expression is satisfied:

$$0.70 < |f2/f| < 2.50$$

Further features of the present invention will become apparent from the following description of exemplary embodiments with reference to the attached drawings.

BRIEF DESCRIPTION OF THE DRAWINGS

FIGS. 2A and 2B are aberration diagrams according to the first embodiment of the present invention in states in which an object at infinity and a close object, respectively, are in focus.

FIGS. 4A and 4B are aberration diagrams according to the second embodiment of the present invention in states in which an object at infinity and a close object, respectively, are in focus.

FIGS. 6A and 6B are aberration diagrams according to the third embodiment of the present invention in states in which an object at infinity and a close object, respectively, are in focus.

FIGS. 8A and 8B are aberration diagrams according to the fourth embodiment of the present invention in states in which an object at infinity and a close object, respectively, are in focus.

DESCRIPTION OF THE EMBODIMENTS

Imaging optical systems according to embodiments of the present invention and an image pickup apparatus including an imaging optical system according to an embodiment of the present invention will now be described.

Each of the imaging optical systems according to the embodiments of the present invention includes, in order from an object side to an image side, a first lens unit having a positive refractive power, a second lens unit having a negative refractive power, an aperture stop, and a third lens unit having a positive refractive power. The second lens unit moves toward the image side during focusing from a far object to a near object.

Figure 1:
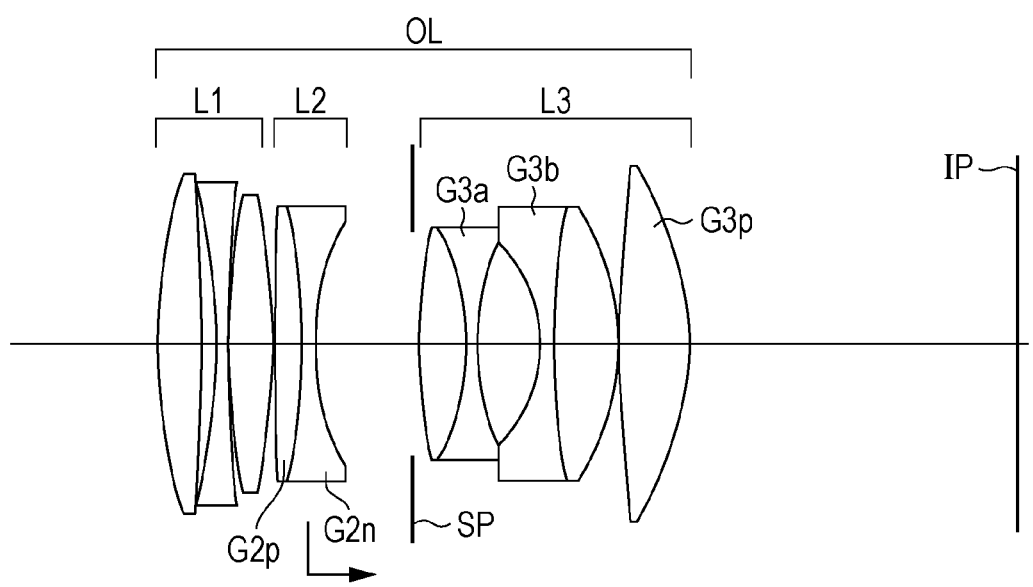
FIG. 1 is a sectional view of a lens according to a first embodiment of the present invention.

FIG. 1 is a sectional view of an imaging optical system according to a first embodiment of the present invention in a state in which an object at infinity is in focus. FIGS. 2A and 2B are longitudinal aberration diagrams of the imaging optical system according to the first embodiment in states in which an object at infinity and a close object (450 mm), respectively, are in focus. The imaging optical system according to the first embodiment has an imaging angle of view of 47.2 degrees and an F number of about 1.45.

Figure 3:
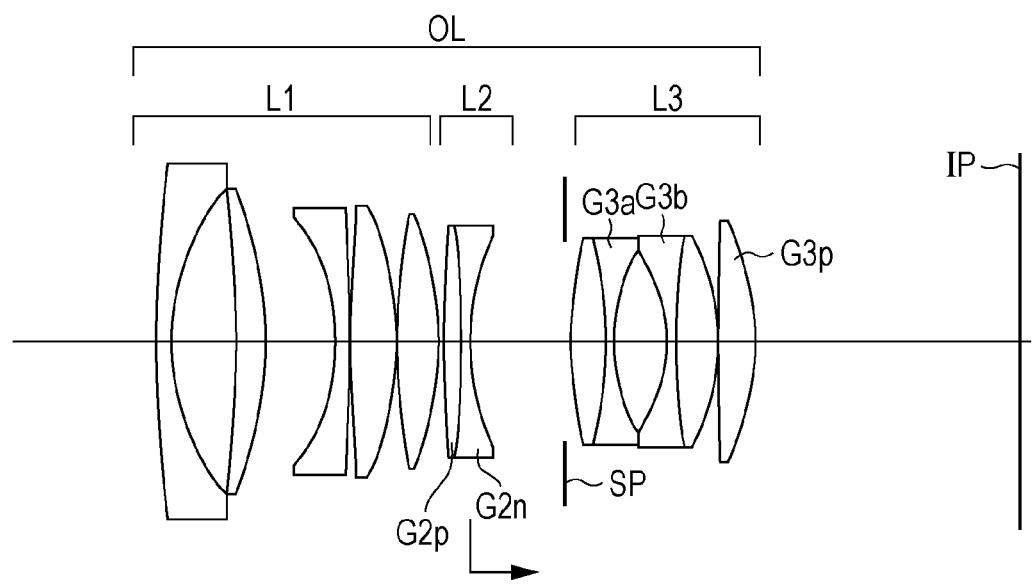
FIG. 3 is a sectional view of a lens according to a second embodiment of the present invention.

FIG. 3 is a sectional view of an imaging optical system according to a second embodiment of the present invention in a state in which an object at infinity is in focus. FIGS. 4A and 4B are longitudinal aberration diagrams of the imaging optical system according to the second embodiment in states in which an object at infinity and a close object (300 mm), respectively, are in focus. The imaging optical system according to the second embodiment has an imaging angle of view of 62.18 degrees and an F number of about 1.45.

Figure 5:
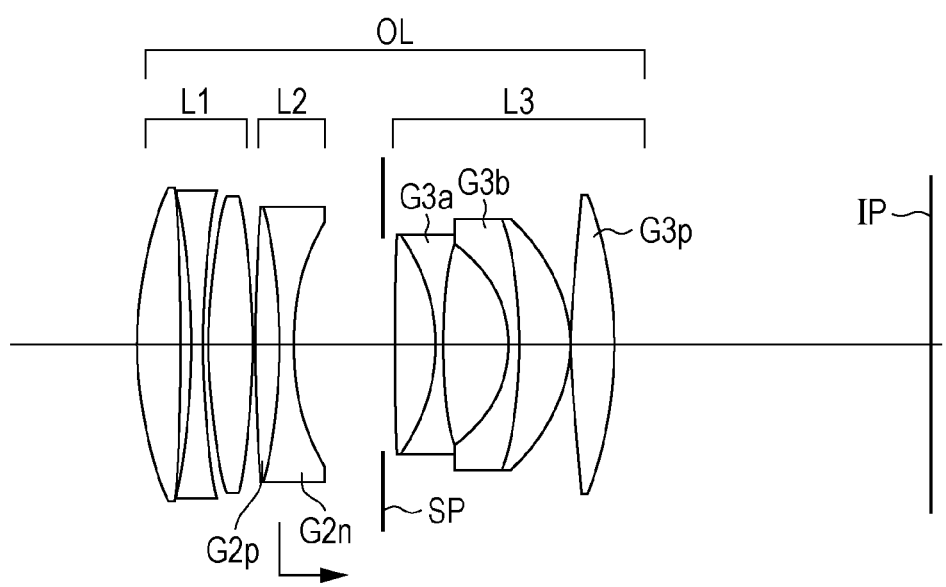
FIG. 5 is a sectional view of a lens according to a third embodiment of the present invention.
Figure 6B:
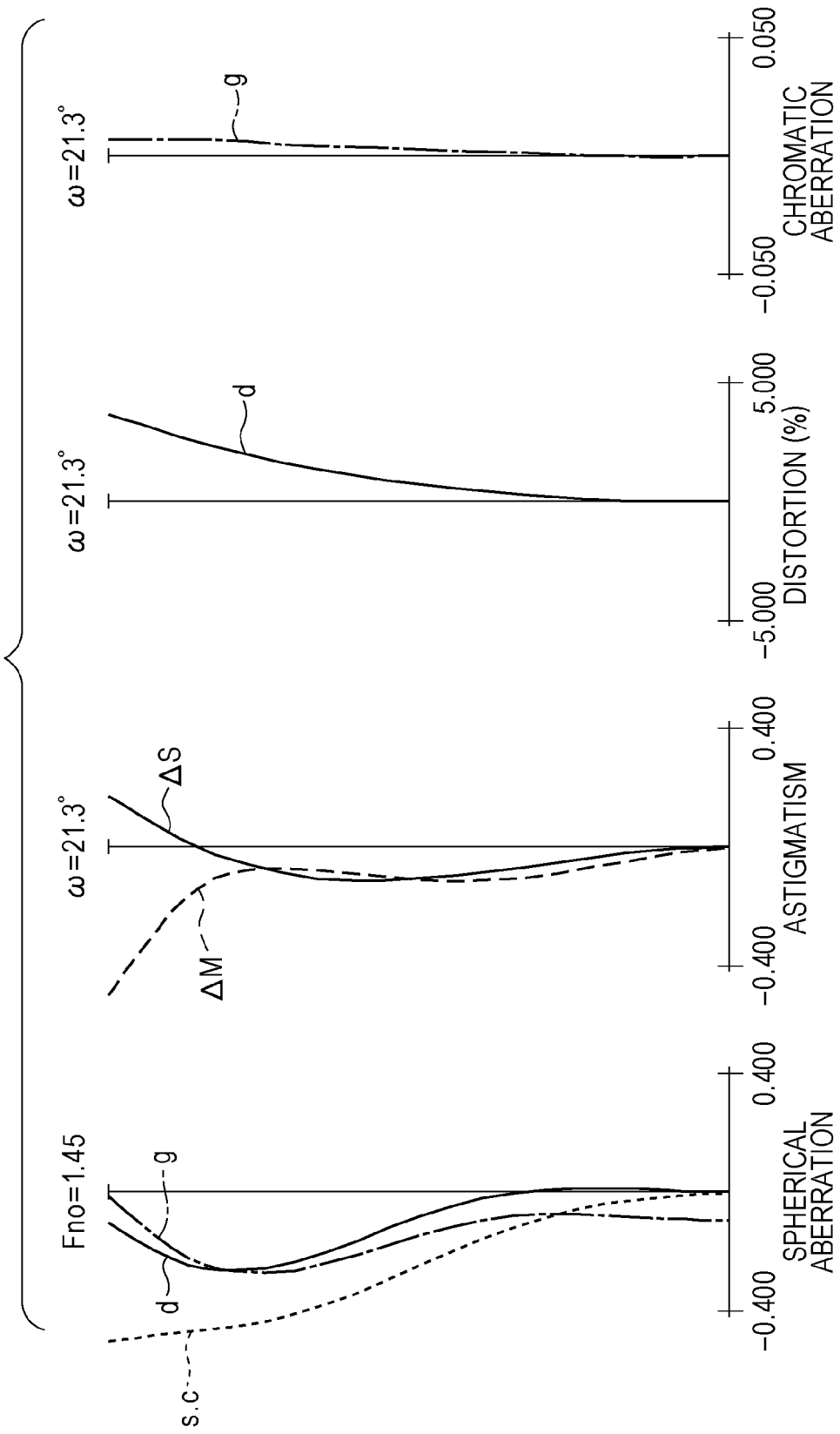

FIG. 5 is a sectional view of an imaging optical system according to a third embodiment of the present invention in a state in which an object at infinity is in focus. FIGS. 6A and 6B are longitudinal aberration diagrams of the imaging optical system according to the third embodiment in states in which an object at infinity and a close object (450 mm), respectively, are in focus. The imaging optical system according to the third embodiment has an imaging angle of view of 42.66 degrees and an F number of about 1.45.

Figure 7:
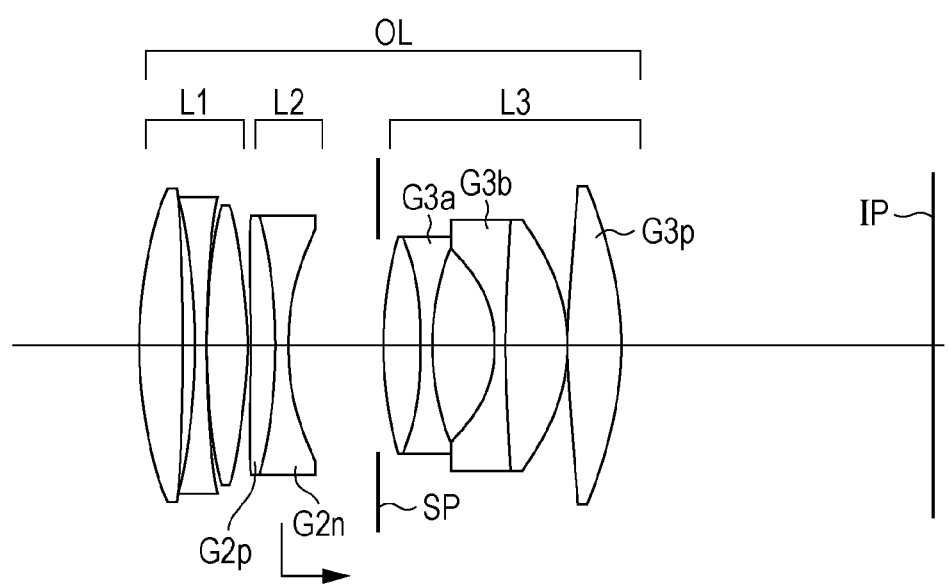
FIG. 7 is a sectional view of a lens according to a fourth embodiment of the present invention.

FIG. 7 is a sectional view of an imaging optical system according to a fourth embodiment of the present invention in a state in which an object at infinity is in focus. FIGS. 8A and 8B are longitudinal aberration diagrams of the imaging optical system according to the fourth embodiment in states in which an object at infinity and a close object (450 mm), respectively, are in focus. The imaging optical system according to the fourth embodiment has an imaging angle of view of 46.18 degrees and an F number of about 1.45.

Figure 9:
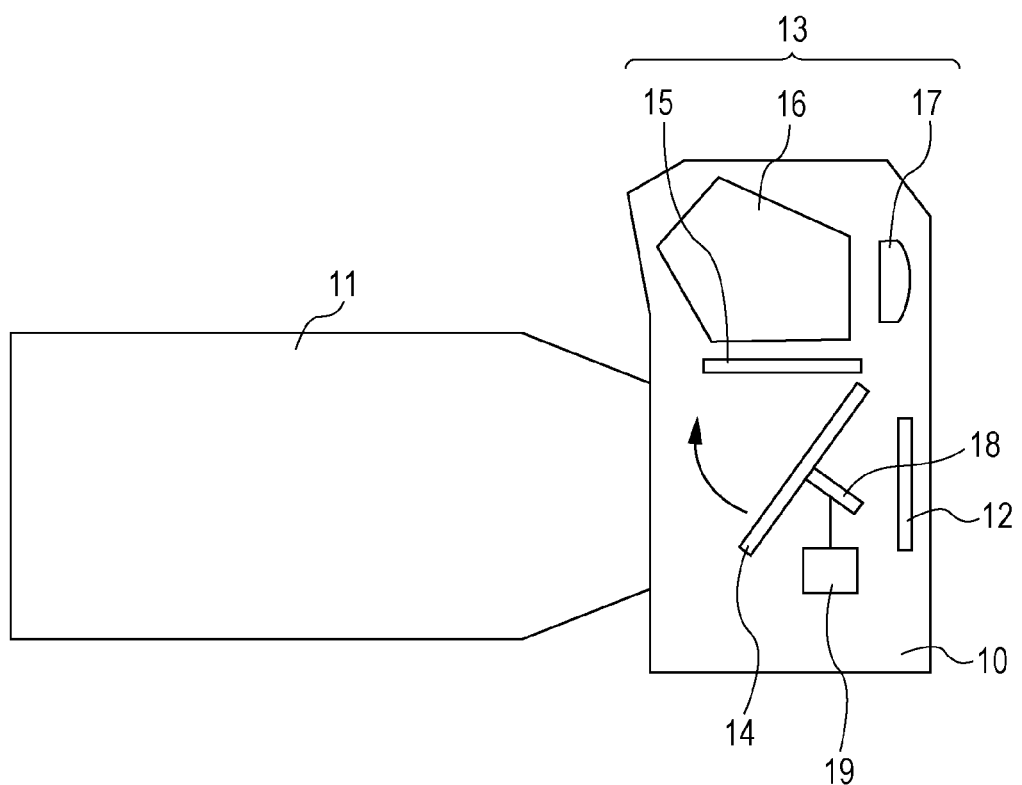
FIG. 9 is a schematic diagram illustrating the main part of an image pickup apparatus according to an embodiment of the present invention.

The numerical values of the distances to the close object are those in numerical examples, which will be described below, in the order of millimeters. FIG. 9 is a schematic diagram illustrating the main part of an image pickup apparatus according to an embodiment of the present invention. In the sectional views, the left side is the object side (front side, magnification side), and the right side is the image side (rear side, reduction side). Each imaging optical system OL includes, in order from the object side to the image side, a first lens unit L1 having a positive refractive power, a second lens unit L2 having a negative refractive power, an aperture stop SP, and a third lens unit L3 having a positive refractive power.

Each second lens unit L2 includes a positive lens G2p and a negative lens G2n. Each third lens unit L3 includes lenses G3a and G3b having concave surfaces that face each other with a largest air gap in the third lens unit L3 provided therebetween, and a positive lens G3p.

An image plane IP corresponds to an image pickup plane of a solid-state image pickup element (photoelectric transducer), such as a CCD sensor or a CMOS sensor, in the case where each imaging optical system is included in a video camera or a digital still camera. In the case where each imaging optical system is included in a silver-halide film camera, the image plane IP corresponds to a film surface. In the graphs of spherical aberration, the solid line d shows the d-line, and the one-dot chain line g shows the g-line. The dotted line S.C. shows the sine condition.

In the graphs of astigmatism, the broken line ΔM shows the meridional image plane of the d-line, and the solid line ΔS shows the sagittal image plane of the d-line. The graph of distortion shows the distortion of the d-line, and the graph of chromatic aberration of magnification shows the chromatic aberration of magnification of the g-line. Fno represents the F number, and ω represents the half angle of view (degrees).

The imaging optical systems according to the embodiments of the present invention include the first lens unit L1 having a positive refractive power, the second lens unit L2 having a negative refractive power, the aperture stop SP, and the third lens unit L3 having a positive refractive power. Focusing from an object at infinity to a close object is performed by moving the second lens unit L2 toward the image side along an optical axis.

In each of the imaging optical systems according to the embodiments, the third lens unit L3 includes, in order from the object side to the image side, the two lenses G3a and G3b having concave surfaces that face each other with a largest air gap in the third lens unit L3 provided therebetween, and the positive lens G3p. When f is the focal length of the entire system and f2 is the focal length of the second lens unit L2, the following conditional expression is satisfied:

$$0.70 < |f2/f| < 2.50 \qquad (1)$$

Each of the imaging optical systems according to the embodiments includes, in order from the object side to the image side, the first lens unit L1 having a positive refractive power, the second lens unit L2 having a negative refractive power, and the third lens unit L3 having a positive refractive power. In addition, the aperture stop SP is provided between the second lens unit L2 and the third lens unit L3.

Gauss-type imaging optical systems are known as imaging optical systems having a wide imaging angle of view of about 40° to 60° and a long back focus. With Gauss-type imaging optical systems, the angle of view, the aperture ratio, and the back focus can be relatively easily increased. In Gauss-type imaging optical systems, focusing is generally performed by moving the entire imaging optical systems. Therefore, the focusing lens unit is heavy and it is difficult to perform high-speed focusing.

Accordingly, the imaging optical systems according to the embodiments of the present invention are configured as inner focus systems in which the second lens unit L2 having a negative refractive power is moved toward the image side during focusing from a far object to a near object. As a result, compared to the case in which the entire imaging optical systems are moved during focusing, the weight of the focusing lens unit can be reduced and high-speed focusing can be facilitated. In addition, the first lens unit L1 having a positive refractive power causes the imaging light beam to converge before being incident on the second lens unit L2, so that the effective diameter of the second lens unit L2 is reduced. Thus, the effective diameter of the focusing lens unit is reduced, and the size of the focusing lens unit is reduced accordingly.

Imaging optical systems having a large imaging angle of view of about 40° to 60° have a relatively short focal length, and it is therefore difficult to increase the back focus. In addition, when the aperture ratio is increased, the lens thickness is also increased, which makes it further difficult to increase the back focus.

Accordingly, in each of the imaging optical systems according to the embodiments of the present invention, the third lens unit L3 is configured to have a so-called retro-focus-type lens structure in which a component having a negative refractive power is arranged at the object side and a component having a positive refractive power is arranged at the image side, so that the back focus can be increased. When the aperture ratio is increased, large aberrations are generally generated by the first lens unit L1. In particular, the spherical aberration and coma aberration increase, and the field curvature also increases as a result of an increase of the Petzval sum in the positive direction. As a result, the image quality is degraded.

Accordingly, each of the imaging optical systems according to the embodiments of the present invention is configured to have a lens structure in which the spherical aberration and coma aberration generated by the first lens unit L1 having a positive refractive power are canceled (corrected) by the second lens unit L2 having a negative refractive power.

In each of the imaging optical systems according to the embodiments of the present invention, the second lens unit L2 having a negative refractive power is moved toward the image side during focusing from a far object to a near object. Therefore, the position at which the axial ray is incident on the second lens unit L2 is lower when a close object is in focus than when an object at infinity is in focus. This means that when a close object is in focus, the aberration cancelling effect provided by the second lens unit L2 is reduced and variations in aberrations due to focusing are increased.

Accordingly, the third lens unit L3 includes the negative lens G3b, which has a concave surface having a strong refractive power at the object side (lens surface having a negative refractive power), as a component having a negative refractive power arranged at the object side. The negative lens G3b which has a concave surface having a strong refractive power at the object side contributes to correcting the spherical aberration and coma aberration generated by the second lens unit L2, thereby reducing the aberrations generated by the second lens unit L2. Thus, the variations in aberrations due to focusing can be easily reduced.

Owing to the negative lens G3b which has a concave surface having a strong negative refractive power at the object side, the third lens unit L3 has a retro-focus-type lens structure and the effect of increasing the back focus is increased. In addition, the Petzval sum can be reduced, so that the increase of field curvature can be suppressed.

In each embodiment, when f2 is the focal length of the second lens unit L2 and f is the focal length of the entire imaging optical system, Conditional Expression (1) is satisfied.

Conditional Expression (1) relates to the refractive power of the second lens unit L2, which is the focusing lens unit, and is provided to reduce variations in aberrations due to focusing while increasing the aperture ratio. When the absolute value of the negative refractive power of the second lens unit L2 is so large that the value of Conditional Expression (1) is below the lower limit thereof, although the amount of movement during focusing can be reduced so that the size of the entire system can be easily reduced, the variations in aberrations due to focusing are increased. When the absolute value of the negative refractive power of the second lens unit L2 is so small that the value of Conditional Expression (1) is above the upper limit thereof, the amount of movement during focusing is increased and the size of the entire system is increased accordingly.

The numerical range of Conditional Expression (1) can instead be set as follows:

$$0.80<|f2/f|<2.30 \quad (1a)$$

The numerical range of Conditional Expression (1a) can instead be set as follows:

$$0.90<|f2/f|<2.10 \quad (1b)$$

With the above-described structure, according to each embodiment, an inner focus imaging optical system having a large imaging angle of view of about 40° to 60°, a large aperture ratio (F number of about 1.4), and a long back focus can be easily provided.

In each embodiment, to further reduce the variations in aberrations during focusing, the third lens unit L3 includes, in order from the object side to the image side, the two lenses G3a and G3b having concave surfaces that face each other with a largest air gap in the third lens unit L3 provided therebetween, and a positive lens. Among the two lenses G3a and G3b having concave surfaces that face each other with the largest air gap provided therebetween, the negative lens G3b having the concave surface that faces the object side corresponds to a lens of the third lens unit L3 having a lens surface (concave surface) having a stronger refractive power on the object side than on the image side.

The concave lens surface arranged on the object side and having a strong negative refractive power contributes to correcting the spherical aberration, coma aberration, and Petzval sum. In particular, high-order coma aberration is reduced. The axial light beam is caused to converge by the first lens unit L1 having a positive refractive power, and is incident on the second lens unit L2. Although the second lens unit L2 having a negative refractive power provides a diverging effect on the axial light beam, the axial light beam converges after passing through the second lens unit L2 owing to the strong converging effect provided by the first lens unit L1. When the light beam that has converged is incident on the concave lens surface at the object side of the lens G3b included in the third lens unit L3, high-order spherical aberration and coma aberration are generated.

Accordingly, the lens G3a is arranged so that the axial light beam that converges after passing through the first lens unit and the second lens unit is caused to diverge by the concave lens surface at the image side. Thus, the incident angle on the concave lens surface of the lens G3b is reduced, and the generation of high-order spherical aberration and coma aberration is suppressed.

In each embodiment, one or more of the conditional expressions provided below can be satisfied.

Here, R3b is the radius of curvature of the object-side lens surface of the lens G3b arranged on the image side of the largest air gap in the third lens unit L3, R3a is the radius of curvature of the image-side lens surface of the lens G3a arranged on the object side of the largest air gap in the third lens unit L3, f1 is the focal length of the first lens unit L1, and f3 is the focal length of the third lens unit L3. The second lens unit L2 includes at least one positive lens G2p and at least one negative lens G2n, and vd is the Abbe number of the positive lens G2p. In addition, fp is the focal length of the positive lens G3p having the strongest refractive power among the positive lenses included in the third lens unit L3.

In this case, one or more of the following conditional expressions are satisfied:

$$0.25 < |R3b/f3| < 0.60 \quad (2)$$

$$0.02 < (R3a+R3b)/(R3a-R3b) < 0.80 \quad (3)$$

$$vd < 23.5 \quad (4)$$

$$0.70 < f1/f < 1.20 \quad (5)$$

$$0.70 < f3/f < 1.50 \quad (6)$$

$$0.60 < f1/f3 < 1.30 \quad (7)$$

$$0.30 < fp/f < 1.00 \quad (8)$$

The technical meaning of the conditional expressions will now be described.

Conditional Expression (2) relates to the refractive power of the object-side lens surface of the negative lens G3b included in the third lens unit L3, and is provided mainly to reduce the variations in aberrations due to focusing. When the absolute value of the negative refractive power of the object-side lens surface of the negative lens G3b is so large that the value of Conditional Expression (2) is below the lower limit thereof, large high-order spherical aberration and coma aberration are generated by this surface and the image quality is degraded. When the absolute value of the negative refractive power of the lens surface is so small that the value of Conditional Expression (2) is above the upper limit thereof, contribution to the correction of aberrations generated by the second lens unit L2 is increased and the variations in aberrations during focusing are increased accordingly.

In addition, the Petzval sum is increased in the positive direction, and the field curvature is increased accordingly. Furthermore, the effect of increasing the back focus provided by the retro-focus-type lens structure of the third lens unit L3 is reduced, and it becomes difficult to achieve a long back focus. The numerical range of Conditional Expression (2) can instead be set as follows:

$$0.27 < |R3b/f3| < 0.55 \quad (2a)$$

The numerical range of Conditional Expression (2a) can instead be set as follows:

$$0.30 < |R3b/f3| < 0.50 \quad (2b)$$

Conditional Expression (3) relates to the radii of curvature of the two lens surfaces having negative refractive powers in the third lens unit L3, and to the contribution to correcting, in particular, the spherical aberration and coma aberration. When the refractive power of the object-side lens surface of the lens G3b on the image side of the largest air gap in the third lens unit L3 is so small that the value of Conditional Expression (3) is below the lower limit thereof, it becomes difficult to correct the spherical aberration, coma aberration, etc., generated by the first lens unit L1, and the quality of the entire image is degraded.

When the refractive power of the object-side lens surface of the lens G3b on the image side of the largest air gap in the third lens unit L3 is so large that the value of Conditional Expression (3) is above the upper limit thereof, large high-order spherical aberration and coma aberration are generated and the image quality is significantly degraded.

The numerical range of Conditional Expression (3) can instead be set as follows:

$$0.05 < (R3a+R3b)/(R3a-R3b) < 0.70 \quad (3a)$$

The numerical range of Conditional Expression (3a) can instead be set as follows:

$$0.07 < (R3a+R3b)/(R3a-R3b) < 0.65 \quad (3b)$$

Conditional Expression (4) relates to the Abbe number of the material of the positive lens G2p in the case where the second lens unit L2 includes at least one positive lens G2p and at least one negative lens G2n. Conditional Expression (4) is provided mainly to reduce the variations in chromatic aberrations during focusing. When the Abbe number of the material of the positive lens G2p is above the upper limit of Conditional Expression (4), the chromatic aberrations cannot be sufficiently corrected by the second lens unit L2 having a negative refractive power, and it becomes difficult to correct the axial chromatic aberration and chromatic aberration of magnification over the entire object distance range.

Conditional Expression (5) relates to the refractive power of the first lens unit L1, and is provided mainly to achieve high optical performance while setting the size of each imaging optical system to an appropriate size. When the refractive power of the first lens unit L1 is so large that the value of Conditional Expression (5) is below the lower limit thereof, the effect of causing the imaging light beam to converge before being incident on the focusing lens unit can be enhanced, and the size of the focusing lens unit can be easily reduced. However, large spherical aberration and coma aberration are generated by the first lens unit L1, and the image quality is degraded. When the refractive power of the first lens unit L1 is so small that the value of Conditional Expression (5) is above the upper limit thereof, the overall length of the optical system (distance from the first lens surface to the last lens surface) is increased.

In particular, the effect of causing the light beam to converge before being incident on the second lens unit L2 is reduced, and the size of the focusing lens unit is increased. The numerical range of Conditional Expression (5) can instead be set as follows:

$$0.75 < f1/f < 1.10 \quad (5a)$$

Conditional Expression (6) relates to the refractive power of the third lens unit L3, and is provided mainly to achieve high optical performance.

Each of the imaging optical systems according to the embodiments includes, in order from the object side to the image side, the first lens unit L1 having a positive refractive power, the second lens unit L2 having a negative refractive power, and the third lens unit L3 having a positive refractive power. In addition, the aperture stop SP is provided between the second lens unit L2 and the third lens unit L3.

Accordingly, the optical arrangement of the entire lens system is substantially symmetrical about the aperture stop SP. With this optical arrangement, off-axis aberrations, in particular, distortion and chromatic aberration of magnification, generated by the first lens unit L1 are corrected by the third lens unit L3.

When the value of Conditional Expression (6) is out of the numerical range thereof, the effect of cancelling the off-axis aberrations generated by the first lens unit L1 and the third lens unit L3 becomes insufficient, and the distortion and chromatic aberration of magnification are increased.

The numerical range of Conditional Expression (6) can instead be set as follows:

$$0.75 < f3/f < 1.40 \quad (6a)$$

Conditional Expression (7) relates to the ratio between the refractive powers of the first lens unit L1 and the third lens unit L3, and is provided mainly to appropriately correct the off-axis aberrations. When the value of Conditional Expression (7) is out of the numerical range thereof, the effect of correcting the off-axis aberrations of the first lens unit L1 and the third lens unit L3 becomes insufficient, and the distortion and chromatic aberration of magnification are increased.

The numerical range of Conditional Expression (7) can instead be set as follows:

$$0.70 < f1/f3 < 1.20 \tag{7a}$$

Conditional Expression (8) relates to the positive lens G3$p$ having the strongest refractive power among the positive lenses included in the third lens unit L3. The positive lens G3$p$ is located closest to the image side. Conditional Expression (8) is provided mainly to achieve high optical performance and a long back focus.

In each of the imaging optical systems according to the embodiments, the third lens unit L3 have a so-called retrofocus-type lens structure in which a component having a negative refractive power is arranged at the object side and a component having a positive refractive power is arranged at the image side, so that the back focus can be increased.

When the refractive power of the positive lens G3$p$ of the third lens unit L3 is so large that the value of Conditional Expression (8) is below the lower limit thereof, the back focus can be easily increased. However, the Petzval sum is increased in the positive direction, and the field curvature is increased accordingly. When the refractive power of the positive lens G3$p$ of the third lens unit L3 is so small that the value of Conditional Expression (8) is above the upper limit thereof, it becomes difficult to increase the back focus.

The numerical range of Conditional Expression (8) can instead be set as follows:

$$0.35 < fp/f < 0.95 \tag{8a}$$

The numerical range of Conditional Expression (8a) can instead be set as follows:

$$0.40 < fp/f < 0.90 \tag{8b}$$

In each of the imaging optical systems according to the embodiments, the third lens unit L3 includes, in order from the object side to the image side, a negative lens G3$b$ which has a lens surface having a negative refractive power at the object side, and a positive lens. When f, f2, and f3, are the focal lengths of the entire system, the second lens unit L2, and the third lens unit L3, respectively, and R3$b$ is the radius of curvature of the object-side lens surface of the negative lens G3$b$, the following conditional expressions can be satisfied.

$$0.70 < |f2/f| < 2.50 \tag{1}$$

$$0.25 < |R3b/f3| < 0.60 \tag{2}$$

As described above, in each of the imaging optical systems according to the embodiments of the present invention, the third lens unit L3 may be include, in order from the object side to the image side, a negative lens G3$b$ which has a lens surface (concave surface) having a negative refractive power at the object side, and a positive lens. When R3$b$ is the radius of curvature of the object-side lens surface of the negative lens G3$b$, Conditional Expression (2×) may be satisfied in addition to Conditional Expression (1).

The technical meaning of Conditional Expression (2×) is the same as that of Conditional Expression (2) described above. Conditional Expressions (4) to (8) described above can be further satisfied in addition to Conditional Expressions (1) and (2×).

The lens structure of each embodiment will now be described. First, the lens structure of each lens unit included in the imaging optical system according to the first embodiment illustrated in FIG. 1 will be described. In the following description, the lens units are arranged in the mentioned order from the object side to the image side. The first lens unit L1 includes three lenses, which are a positive biconvex lens, a negative biconcave lens, and a positive biconvex lens. In the first lens unit L1, the positive lens that is closest to the object side has an aspherical surface.

This aspherical surface appropriately corrects mainly the coma aberration. The second lens unit L2 includes a cemented lens in which a positive biconvex lens G2$p$ and a negative biconcave lens G2$n$ are cemented together. In the second lens unit L2, the lens surface that is closest to the image side has an aspherical shape. This aspherical lens surface appropriately corrects the coma aberration.

The third lens unit L3 includes a cemented lens in which a positive biconvex lens and a negative biconcave lens G3$a$ are cemented together; a cemented lens in which a negative biconcave lens G3$b$ and a positive biconvex lens are cemented together, the absolute value of the refractive power of the negative biconcave lens G3$b$ being higher on the object side than on the image side; and a positive biconvex lens G3$p$. In the third lens unit L3, the lens surface that is closest to the image side has an aspherical shape. This aspherical lens surface appropriately corrects the off-axis aberrations. The aperture stop SP is disposed between the second lens unit L2 and the third lens unit L3.

The lens structure of the imaging optical system according to the second embodiment of the present invention will now be described with reference to FIG. 3. The lens structure (distribution of refractive power) of the imaging optical system according to the second embodiment illustrated in FIG. 3 is the same as that in the first embodiment. The lens structure of each lens unit in the imaging optical system according to the second embodiment will be described. In the following description, the lens units are arranged in the mentioned order from the object side to the image side. The first lens unit L1 includes a negative meniscus lens having a convex surface on the object side, a positive meniscus lens having a concave surface on the object side, a negative meniscus lens having a concave surface on the object side, a positive biconvex lens having an aspherical lens surface on the object side, and a positive biconvex lens.

The aspherical surface of the positive biconvex lens appropriately corrects the spherical aberration and coma aberration. The lens structures of the second lens unit L2 and the third lens unit L3 are the same as those in the first embodiment. The structure for realizing an inner focus system having a large aperture ratio and a long back focus is similar to that in the first embodiment.

The lens structure of the imaging optical system according to the third embodiment of the present invention will now be described with reference to FIG. 5. The lens structure (distribution of refractive power) of the imaging optical system according to the third embodiment illustrated in FIG. 5 is the same as that in the first embodiment. The lens structure of each lens unit in the imaging optical system according to the third embodiment will be described. In the following description, the lens units are arranged in the mentioned order from the object side to the image side. The lens structures of the first lens unit L1 and the second lens unit L2 are the same as those in the first embodiment.

The third lens unit L3 includes a cemented lens in which a positive biconvex lens and a negative biconcave lens G3$a$ are cemented together; a cemented lens in which a negative meniscus lens G3$b$ and a positive meniscus lens having a convex surface on the image side are cemented together, the absolute value of the refractive power of the negative meniscus lens G3b being higher on the object side than on the image side; and a positive biconvex lens G3p. In the third lens unit L3, the lens surface that is closest to the image side has an aspherical shape. This aspherical lens surface appropriately corrects the off-axis aberrations. The structure for realizing an inner focus system having a large aperture ratio and a long back focus is similar to that in the first embodiment.

The lens structure of the imaging optical system according to the fourth embodiment of the present invention will now be described with reference to FIG. 7. The lens structure (distribution of refractive power) of the imaging optical system according to the fourth embodiment illustrated in FIG. 7 is the same as that in the first embodiment. The lens structure of each lens unit in the imaging optical system according to the fourth embodiment will be described. The lens structures of the first, second, and third lens units L1, L2, and L3 are the same as those in the first embodiment. The structure for realizing an inner focus system having a large aperture ratio and a long back focus is similar to that in the first embodiment.

Although embodiments of the present invention are described above, the present invention is not limited to the above-described embodiments, and various modifications and alterations are possible within the scope of the present invention.

A single-lens reflex camera system (image pickup apparatus) including an imaging optical system according to an embodiment of the present invention will now be described with reference to FIG. 9.

Referring to FIG. 9, the single-lens reflex camera system includes a single-lens reflex camera body 10 and an interchangeable lens 11 including an imaging optical system according to an embodiment of the present invention. A recording unit 12, such as a film or an image pickup element, records (receives) an object image obtained through the interchangeable lens 11. A finder optical system 13 allows a user to observe the object image obtained through the interchangeable lens 11. A quick return mirror 14 is provided in a pivotable manner so that the object image obtained through the interchangeable lens 11 can be selectively transmitted to the recording unit 12 or the finder optical system 13.

When the object image is observed through a finder, the object image is formed on a focusing plate 15 through the quick return mirror 14, is formed into an erect image by a pentagonal prism 16, and is magnified by an ocular optical system 17 so that the object image can be observed. In an imaging operation, the quick return mirror 14 is pivoted in the direction shown by the arrow and the object image is formed on the recording unit 12 and is recorded. The single-lens reflex camera system also includes a sub-mirror 18 and a focal-point detecting device 19.

As in this case, when an imaging optical system according to an embodiment of the present invention is included in an image pickup apparatus, such as an interchangeable lens of a single-lens reflex camera system, an inner focus image pickup apparatus having a wide angle of view of about 40° to 60° and a large aperture ratio (F number of about 1.4) can be realized. The present invention may also be applied to a camera that does not include a quick return mirror.

Next, first to fourth numerical examples corresponding to the imaging optical systems according to the first to fourth embodiments of the present invention will be described. In each numerical example, i represents the surface number counted from the object side, ri represents the radius of curvature of the $i^{th}$ lens surface from the object side, di represents the lens thickness of the air gap of the $i^{th}$ lens, and ndi and vdi are the refractive index and the Abbe number, respectively, of the material of the $i^{th}$ lens at the d-line. The values corresponding to variable gaps are those when the object distance varies.

With regard to the shape of each aspherical surface, when the direction in which light travels is the positive direction, x is the displacement from the vertex of the aspherical surface in the optical axis direction, h is the height from the optical axis in a direction perpendicular to the optical axis, r is the paraxial radius of curvature, K is the conic constant, and A4, A6, A8, A10, and A12 are aspherical coefficients, the shape of each aspherical surface is expressed as follows:

$$x=(h2/r)/[1+\{1-(1+K)\times(h/r)2\}^{1/2}]+A4\times h4+A6\times h6+A8\times h8+A10\times h10+A12\times h12$$

First Numerical Example

| Unit: mm | | | | | |
|---|---|---|---|---|---|
| Surface Data | | | | | |
| Surface No. | r | d | nd | vd | Effective Diameter |
| 1 | 61.471 | 5.22 | 1.85400 | 40.4 | 37.87 |
| 2* | −169.176 | 1.55 | | | 36.77 |
| 3 | −78.868 | 1.30 | 1.80809 | 22.8 | 36.24 |
| 4 | 131.780 | 0.20 | | | 33.72 |
| 5 | 85.204 | 4.90 | 1.88300 | 40.8 | 33.11 |
| 6 | −88.169 | (variable) | | | 32.46 |
| 7 | 294.021 | 3.04 | 1.80809 | 22.8 | 30.59 |
| 8 | −69.834 | 1.60 | 1.77250 | 49.6 | 30.12 |
| 9* | 32.320 | (variable) | | | 27.08 |
| 10 (stop) | ∞ | 0.70 | | | 25.89 |
| 11 | 51.567 | 5.49 | 1.80400 | 46.6 | 25.55 |
| 12 | −30.600 | 1.20 | 1.65412 | 39.7 | 25.19 |
| 13 | 30.799 | 7.37 | | | 22.58 |
| 14 | −16.352 | 1.50 | 1.85478 | 24.8 | 22.41 |
| 15 | 70.692 | 7.43 | 1.88300 | 40.8 | 27.93 |
| 16 | −28.636 | 0.15 | | | 30.28 |
| 17 | 153.506 | 8.05 | 1.85400 | 40.4 | 38.94 |
| 18* | −33.829 | (variable) | | | 39.58 |
| Image Surface | ∞ | | | | |

| Aspherical Data | | |
|---|---|---|
| 2nd Surface | | |
| K = 0.00000e+000 | A4 = 1.89259e−006 | A6 = −7.63221e−010 |
| A8 = −2.23250e−013 | A10 = 2.49921e−015 | |
| 9th Surface | | |
| K = 0.00000e+000 | A4 = 8.69296e−007 | A6 = 1.56418e−008 |
| A8 = −1.51039e−010 | A10 = 7.43393e−013 | A12 = −1.49889e−015 |
| 18th Surface | | |
| K = 0.00000e+000 | A4 = 4.17822e−006 | A6 = 2.03663e−009 |
| A8 = 1.86499e−013 | A10 = 8.53744e−016 | |

| Various Data | |
|---|---|
| Focal Length | 49.53 |
| F-number | 1.45 |
| Half Angle of View (degrees) | 23.60 |
| Image Height | 21.64 |
| Overall Lens Length | 99.46 |
| BF | 38.10 |

| | Object at Infinity | Object at 450 mm |
|---|---|---|
| d6 | 0.48 | 7.60 |
| d9 | 11.19 | 4.06 |
| d18 | 38.10 | 38.10 |

-continued

Unit: mm

| | |
|---|---|
| Entrance Pupil Position | 31.21 |
| Exit Pupil Position | −73.38 |
| Front Principal Point Position | 58.74 |
| Rear Principal Point Position | −11.43 |

Zoom Lens Unit Data

| Unit | Start Surface | Focal Length | Lens Structure Length | Front Principal Point Position | Rear Principal Point Position |
|---|---|---|---|---|---|
| L1 | 1 | 45.41 | 13.17 | 3.30 | −4.97 |
| L2 | 7 | −48.86 | 4.64 | 2.98 | 0.37 |
| L3 | 10 | 41.13 | 31.88 | 27.31 | 7.88 |

Single Lens Data

| Lens | Start Surface | Focal Length |
|---|---|---|
| 1 | 1 | 53.35 |
| 2 | 3 | −60.89 |
| 3 | 5 | 49.73 |
| 4 | 7 | 70.09 |
| 5 | 8 | −28.41 |
| 6 | 11 | 24.62 |
| 7 | 12 | −23.29 |
| 8 | 14 | −15.41 |
| 9 | 15 | 23.92 |
| 10 | 17 | 33.11 |

Second Numerical Example

Unit: mm

Surface Data

| Surface No. | r | d | nd | vd | Effective Diameter |
|---|---|---|---|---|---|
| 1 | 165.189 | 2.50 | 1.72916 | 54.7 | 51.05 |
| 2 | 35.993 | 9.16 | | | 44.48 |
| 3 | −196.245 | 4.40 | 1.84666 | 23.9 | 44.41 |
| 4 | −61.179 | 10.52 | | | 44.31 |
| 5 | −30.643 | 1.90 | 1.80809 | 22.8 | 36.00 |
| 6 | −402.160 | 0.20 | | | 37.79 |
| 7* | 136.859 | 6.80 | 1.85400 | 40.4 | 38.30 |
| 8 | −48.859 | 0.20 | | | 38.68 |
| 9 | 109.645 | 5.82 | 1.72916 | 54.7 | 36.39 |
| 10 | −51.807 | (variable) | | | 36.38 |
| 11 | 187.717 | 2.40 | 1.80809 | 22.8 | 33.20 |
| 12 | −185.275 | 1.50 | 1.77250 | 49.6 | 32.80 |
| 13* | 40.799 | (variable) | | | 30.43 |
| 14 (stop) | ∞ | 0.80 | | | 29.46 |
| 15 | 73.090 | 5.24 | 1.83481 | 42.7 | 29.26 |
| 16 | −60.391 | 1.30 | 1.51742 | 52.4 | 28.79 |
| 17 | 29.107 | 7.48 | | | 26.34 |
| 18 | −23.041 | 1.50 | 1.80809 | 22.8 | 26.32 |
| 19 | 154.263 | 6.01 | 1.88300 | 40.8 | 29.75 |
| 20 | −32.463 | 0.15 | | | 30.51 |
| 21 | 326.570 | 5.45 | 1.77250 | 49.6 | 33.83 |
| 22* | −38.496 | (variable) | | | 34.41 |
| Image Surface | ∞ | | | | |

Aspherical Data

7th Surface

K = 0.00000e+000  A4 = −5.21875e−006  A6 = 5.13741e−009
A8 = −2.05161e−011  A10 = 4.53067e−014  A12 = −4.02280e−017

13th Surface

K = 0.00000e+000  A4 = 1.91423e−006  A6 = 1.73656e−008
A8 = −8.83548e−011  A10 = 2.38442e−013  A12 = −1.93864e−016

-continued

Unit: mm

22nd Surface

K = 0.00000e+000  A4 = 2.93084e−006  A6 = −9.04798e−009
A8 = 7.06725e−011  A10 = −2.46566e−013  A12 = 3.02917e−016

Various Data

| | |
|---|---|
| Focal Length | 35.88 |
| F-number | 1.45 |
| Half Angle of View (degrees) | 31.09 |
| Image Height | 21.64 |
| Overall Lens Length | 126.92 |
| BF | 38.77 |

| | Object at Infinity | Object at 300 mm |
|---|---|---|
| d10 | 0.90 | 10.76 |
| d13 | 13.91 | 4.06 |
| d22 | 38.77 | 38.77 |
| Entrance Pupil Position | 34.83 | |
| Exit Pupil Position | −41.84 | |
| Front Principal Point Position | 54.74 | |
| Rear Principal Point Position | 2.90 | |

Zoom Lens Unit Data

| Unit | Start Surface | Focal Length | Lens Structure Length | Front Principal Point Position | Rear Principal Point Position |
|---|---|---|---|---|---|
| L1 | 1 | 38.53 | 41.50 | 33.31 | 13.45 |
| L2 | 11 | −70.14 | 3.90 | 2.87 | 0.67 |
| L3 | 14 | 48.17 | 27.93 | 23.65 | 4.63 |

Single Lens Data

| Lens | Start Surface | Focal Length |
|---|---|---|
| 1 | 1 | −63.63 |
| 2 | 3 | 103.44 |
| 3 | 5 | −41.14 |
| 4 | 7 | 42.88 |
| 5 | 9 | 49.00 |
| 6 | 11 | 115.72 |
| 7 | 12 | −43.16 |
| 8 | 15 | 40.33 |
| 9 | 16 | −37.77 |
| 10 | 18 | −24.71 |
| 11 | 19 | 30.84 |
| 12 | 21 | 44.87 |

Third Numerical Example

Unit: mm

Surface Data

| Surface No. | r | d | nd | vd | Effective Diameter |
|---|---|---|---|---|---|
| 1 | 55.053 | 5.48 | 1.85400 | 40.4 | 38.31 |
| 2* | −177.868 | 1.44 | | | 37.89 |
| 3 | −89.439 | 1.30 | 1.80809 | 22.8 | 37.72 |
| 4 | 104.212 | 0.74 | | | 36.77 |
| 5 | 83.910 | 5.52 | 1.88300 | 40.8 | 36.70 |
| 6 | −91.963 | (variable) | | | 36.29 |
| 7 | 199.530 | 3.16 | 1.80809 | 22.8 | 33.53 |
| 8 | −75.997 | 1.60 | 1.77250 | 49.6 | 33.18 |
| 9* | 32.008 | (variable) | | | 29.08 |
| 10 (stop) | ∞ | 1.50 | | | 27.10 |
| 11 | 262.122 | 5.01 | 1.80400 | 46.6 | 26.63 |
| 12 | −26.706 | 1.20 | 1.69895 | 30.1 | 26.40 |
| 13 | 64.679 | 8.08 | | | 24.77 |

-continued

Unit: mm

| | | | | | |
|---|---|---|---|---|---|
| 14 | −15.491 | 1.50 | 1.85478 | 24.8 | 24.60 |
| 15 | −61.957 | 6.35 | 1.88300 | 40.8 | 30.01 |
| 16 | −20.907 | 0.15 | | | 31.16 |
| 17 | 134.693 | 5.51 | 1.85400 | 40.4 | 36.58 |
| 18* | −54.170 | (variable) | | | 37.02 |
| Image Surface | ∞ | | | | |

Aspherical Data

2nd Surface

K = 0.00000e+000    A4 = 2.13244e−006    A6 = −2.33779e−009
A8 = 5.23767e−012    A10 = −4.15074e−015

9th Surface

K = 0.00000e+000    A4 = 2.14399e−006    A6 = −1.36148e−008
A8 = 1.72068e−010    A10 = −7.81277e−013    A12 = 1.01527e−015

18th Surface

K = 0.00000e+000    A4 = 1.02853e−006    A6 = 1.97165e−009
A8 = −4.66405e−012    A10 = 4.24595e−015

Various Data

| | |
|---|---|
| Focal Length | 55.42 |
| F-number | 1.45 |
| Half Angle of View (degrees) | 21.33 |
| Image Height | 21.64 |
| Overall Lens Length | 100.44 |
| BF | 40.24 |

| | Object at Infinity | Object at 450 mm |
|---|---|---|
| d6 | 0.48 | 7.61 |
| d9 | 11.19 | 4.06 |
| d18 | 40.24 | 40.24 |
| Entrance Pupil Position | 34.62 | |
| Exit Pupil Position | −57.50 | |
| Front Principal Point Position | 58.62 | |
| Rear Principal Point Position | −15.18 | |

Zoom Lens Unit Data

| Unit | Start Surface | Focal Length | Lens Structure Length | Front Principal Point Position | Rear Principal Point Position |
|---|---|---|---|---|---|
| L1 | 1 | 44.24 | 14.48 | 3.63 | −5.68 |
| L2 | 7 | −51.68 | 4.76 | 3.27 | 0.58 |
| L3 | 10 | 47.00 | 29.30 | 28.11 | 12.45 |

Single Lens Data

| Lens | Start Surface | Focal Length |
|---|---|---|
| 1 | 1 | 49.77 |
| 2 | 3 | −59.38 |
| 3 | 5 | 50.43 |
| 4 | 7 | 68.46 |
| 5 | 8 | −28.97 |
| 6 | 11 | 30.38 |
| 7 | 12 | −26.90 |
| 8 | 14 | −24.53 |
| 9 | 15 | 33.32 |
| 10 | 17 | 45.85 |

Fourth Numerical Example

Unit: mm

Surface Data

| Surface No. | r | d | nd | vd | Effective Diameter |
|---|---|---|---|---|---|
| 1 | 54.556 | 5.51 | 1.85400 | 40.4 | 37.84 |
| 2* | −185.573 | 1.55 | | | 36.69 |
| 3 | −82.615 | 1.30 | 1.80809 | 22.8 | 36.06 |
| 4 | 116.619 | 0.20 | | | 33.46 |
| 5 | 95.909 | 4.83 | 1.88300 | 40.8 | 33.42 |
| 6 | −85.738 | (variable) | | | 33.07 |
| 7 | 673.485 | 2.92 | 1.80809 | 22.8 | 31.22 |
| 8 | −68.661 | 1.60 | 1.72916 | 54.7 | 30.77 |
| 9* | 31.342 | (variable) | | | 27.51 |
| 10 (stop) | ∞ | 0.70 | | | 26.31 |
| 11 | 49.193 | 4.72 | 1.80400 | 46.6 | 25.94 |
| 12 | −47.373 | 1.20 | 1.64769 | 33.8 | 25.54 |
| 13 | 31.079 | 7.72 | | | 23.36 |
| 14 | −16.912 | 1.50 | 1.85478 | 24.8 | 23.22 |
| 15 | 170.183 | 7.47 | 1.88300 | 40.8 | 27.98 |
| 16 | −25.506 | 0.15 | | | 29.79 |
| 17 | 138.154 | 6.83 | 1.85400 | 40.4 | 37.95 |
| 18* | −42.713 | (variable) | | | 38.51 |
| Image Surface | ∞ | | | | |

Aspherical Data

2nd Surface

K = 0.00000e+000    A4 = 2.03324e−006    A6 = −1.40953e−009
A8 = 1.77105e−012    A10 = 8.86546e−018

9th Surface

K = 0.00000e+000    A4 = 6.61881e−007    A6 = 1.24378e−008
A8 = −1.05623e−010    A10 = 4.71960e−013    A12 = −8.97003e−016

18th Surface

K = 0.00000e+000    A4 = 1.91816e−006    A6 = 1.18504e−009
A8 = −2.06851e−012    A10 = 1.92835e−015

Various Data

| | |
|---|---|
| Focal Length | 50.75 |
| F-number | 1.45 |
| Half Angle of View (degrees) | 23.09 |
| Image Height | 21.64 |
| Overall Lens Length | 98.17 |
| BF | 38.29 |

| | Object at Infinity | Object at 450 mm |
|---|---|---|
| d6 | 0.48 | 7.47 |
| d9 | 11.19 | 4.19 |
| d18 | 38.29 | 38.29 |
| Entrance Pupil Position | 31.84 | |
| Exit Pupil Position | −61.60 | |
| Front Principal Point Position | 56.80 | |
| Rear Principal Point Position | −12.46 | |

Zoom Lens Unit Data

| Unit | Start Surface | Focal Length | Lens Structure Length | Front Principal Point Position | Rear Principal Point Position |
|---|---|---|---|---|---|
| L1 | 1 | 45.14 | 13.40 | 3.01 | −5.42 |
| L2 | 7 | −48.03 | 4.52 | 2.75 | 0.20 |
| L3 | 10 | 42.42 | 30.29 | 26.26 | 7.33 |

Single Lens Data

| Lens | Start Surface | Focal Length |
|---|---|---|
| 1 | 1 | 49.90 |
| 2 | 3 | −59.67 |

-continued

Unit: mm

| 3 | 5 | 51.92 |
|---|---|---|
| 4 | 7 | 77.24 |
| 5 | 8 | −29.31 |
| 6 | 11 | 30.68 |
| 7 | 12 | −28.80 |
| 8 | 14 | −17.93 |
| 9 | 15 | 25.58 |
| 10 | 17 | 38.88 |

TABLE 1

| Conditional Expression | | Numerical Example | | | |
|---|---|---|---|---|---|
| | | 1 | 2 | 3 | 4 |
| Conditional Expression (1) | \|f2/f\| | 0.99 | 1.95 | 0.93 | 0.95 |
| Conditional Expression (2) | \|R3b/f3\| | 0.40 | 0.48 | 0.33 | 0.40 |
| Conditional Expression (3) | (R3a + R3b)/(R3a − R3b) | 0.30 | 0.12 | 0.61 | 0.30 |
| Conditional Expression (4) | νd | 22.76 | 22.76 | 22.76 | 22.76 |
| Conditional Expression (5) | f1/f | 0.92 | 1.07 | 0.80 | 0.89 |
| Conditional Expression (6) | f3/f | 0.83 | 1.34 | 0.85 | 0.84 |
| Conditional Expression (7) | f1/f3 | 1.10 | 0.80 | 0.94 | 1.06 |
| Conditional Expression (8) | fp/f | 0.48 | 0.86 | 0.60 | 0.50 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-279048, filed Dec. 21, 2012, which is hereby incorporated by reference herein in its entirety.

What is claimed is:

1. An imaging optical system comprising, in order from an object side to an image side:
   a first lens unit having a positive refractive power;
   a second lens unit having a negative refractive power;
   an aperture stop; and
   a third lens unit having a positive refractive power,
   wherein the second lens unit moves toward the image side during focusing from a far object to a near object,
   wherein the third lens unit includes, in order from the object side to the image side, two lenses having concave surfaces that face each other with a largest air gap in the third lens unit provided therebetween, and a positive lens, and
   wherein, when f is a focal length of the entire imaging optical system and f2 is a focal length of the second lens unit, the following conditional expression is satisfied:

$0.70 < \star f2/f| < 2.50$.

2. The imaging optical system according to claim 1, wherein, when R3b is a radius of curvature of an object-side lens surface of the lens on the image side of the largest air gap in the third lens unit and f3 is a focal length of the third lens unit, the following conditional expression is satisfied:

$0.25 < |R3b/f3| < 0.60$.

3. The imaging optical system according to claim 1, wherein, when R3a is a radius of curvature of an image-side lens surface of the lens on the object side of the largest air gap in the third lens unit and R3b is a radius of curvature of an object-side lens surface of the lens on the image side of the largest air gap in the third lens unit, the following conditional expression is satisfied:

$0.02 < (R3a+R3b)/(R3a-R3b) < 0.80$.

4. The imaging optical system according to claim 1, wherein the second lens unit includes at least one positive lens and at least one negative lens, and
   wherein, when νd is an Abbe number of a material of the positive lens of the second lens unit, the following conditional expression is satisfied:

$νd < 23.5$.

5. The imaging optical system according to claim 1, wherein, when f1 is a focal length of the first lens unit, the following conditional expression is satisfied:

$0.70 < f1/f < 1.20$.

6. The imaging optical system according to claim 1, wherein, when f3 is a focal length of the third lens unit, the following conditional expression is satisfied:

$0.70 < f3/f < 1.50$.

7. The imaging optical system according to claim 1, wherein, when f1 is a focal length of the first lens unit and f3 is a focal length of the third lens unit, the following conditional expression is satisfied:

$0.60 < f1/f3 < 1.30$.

8. The imaging optical system according to claim 1, wherein, when fp is a focal length of a positive lens having the strongest refractive power among one or more positive lenses included in the third lens unit, the following conditional expression is satisfied:

$0.30 < fp/f < 1.00$.

9. The imaging optical system according to claim 1, wherein the imaging optical system forms an image on a photoelectric transducer.

10. An imaging optical system comprising, in order from an object side to an image side:
    a first lens unit having a positive refractive power;
    a second lens unit having a negative refractive power;
    an aperture stop; and
    a third lens unit having a positive refractive power,
    wherein the second lens unit moves toward the image side during focusing from a far object to a near object,
    wherein the third lens unit includes, in order from the object side to the image side, a negative lens having a lens surface with a negative refractive power at the object side, and a positive lens, and
    wherein, when f is a focal length of the entire imaging optical system, f2 is a focal length of the second lens unit, f3 is a focal length of the third lens unit, and R3b is a radius of curvature of the object-side lens surface of the negative lens, the following conditional expression is satisfied:

$0.70 < |f2/f| < 2.50$ $0.25 < |R3b/f3| < 0.60$.

11. An image pickup apparatus comprising:
an imaging optical system; and
a photoelectric transducer that receives an image formed by the imaging optical system,
wherein the imaging optical system includes, in order from an object side to an image side,
a first lens unit having a positive refractive power,
a second lens unit having a negative refractive power,
an aperture stop, and
a third lens unit having a positive refractive power,
wherein the second lens unit moves toward the image side during focusing from a far object to a near object,
wherein the third lens unit includes, in order from the object side to the image side, two lenses having concave surfaces that face each other with a largest air gap in the third lens unit provided therebetween, and a positive lens, and
wherein, when f is a focal length of the entire imaging optical system and f2 is a focal length of the second lens unit, the following conditional expression is satisfied:

$0.70 < |f2/f| < 2.50$.

* * * * *